United States Patent [19]

Kipe

[11] Patent Number: 4,854,268
[45] Date of Patent: Aug. 8, 1989

[54] MILKING PLANT AND SORTING SYSTEM

[76] Inventor: H. Kenneth Kipe, 3791 Church Rd., Chambersburg, Pa. 17201

[21] Appl. No.: 205,657

[22] Filed: Jun. 13, 1988

[51] Int. Cl.⁴ .................................................. A01K 1/12
[52] U.S. Cl. ..................................... 119/14.03; 119/27
[58] Field of Search ................... 119/14.03, 16, 27, 99

[56] References Cited

U.S. PATENT DOCUMENTS

| | | | |
|---|---|---|---|
| 2,689,546 | 9/1954 | Petri | 119/14.03 |
| 2,779,309 | 1/1957 | Myer et al. | 119/27 |
| 3,810,442 | 5/1974 | Jacobs et al. | 119/14.03 |
| 3,894,516 | 7/1975 | Schaefer | 119/155 |
| 4,362,127 | 12/1982 | Nielsen et al. | 119/14.03 |
| 4,513,687 | 4/1985 | De Jong | 119/14.03 |

OTHER PUBLICATIONS

"Going Behind to Get Ahead", *Successful Farming*, Jan. 1988, p. 40.

*Primary Examiner*—Robert P. Swiatek
*Attorney, Agent, or Firm*—Neil F. Markva

[57] ABSTRACT

A milking and sorting system comprises at least one parlor including a floor, a plurality of stalls juxtaposed along the floor, an animal entrance mechanism to each stall and an animal exit mechanism disposed along an exit side of the parlor. One parlor end has an animal ingress entry opening and the other parlor end has a distal end barrier. Gutter and kicker structures laterally spaced from the parlor exit side define one side of an animal passageway from the animal ingress entry end to the distal parlor end barrier. Wall partitions secured to vertically disposed posts fixed to the floor at the parlor exit side define a plurality of stalls. The fixed wall partitions have free ends laterally spaced inwardly from the gutter and kicker structure to define the other side of the animal passageway. Animal exit gate members pivotally swing outwardly from the parlor exit side between closed and opened position. Each gate member defines an aperture through which a confined animal's head and neck portion protrude when the gate member is in a closed position. Each gate member frame structure includes a neck portion contacting section and lower obstruction section to control movement of an animal confined for milking from between its hind legs.

17 Claims, 5 Drawing Sheets

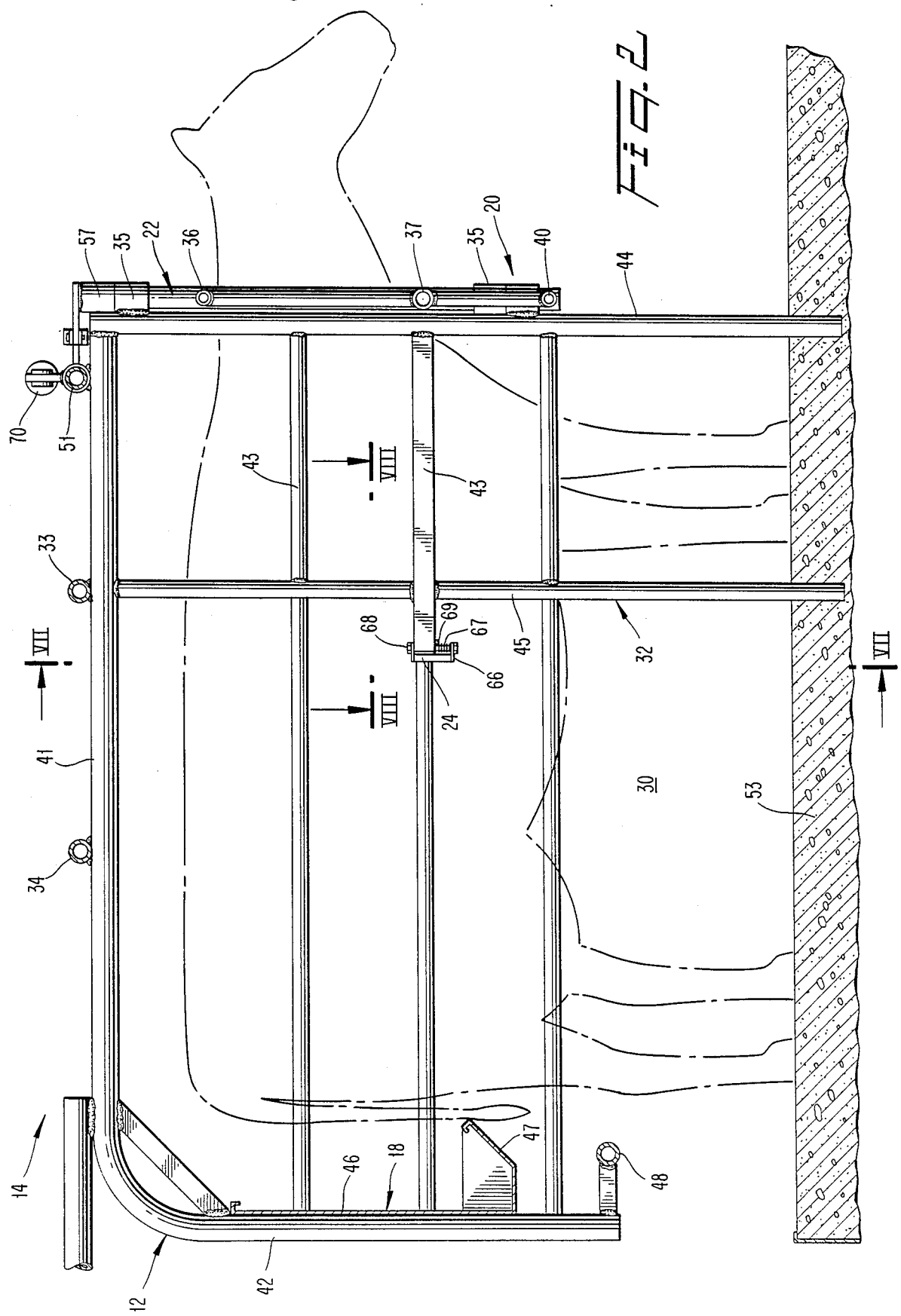

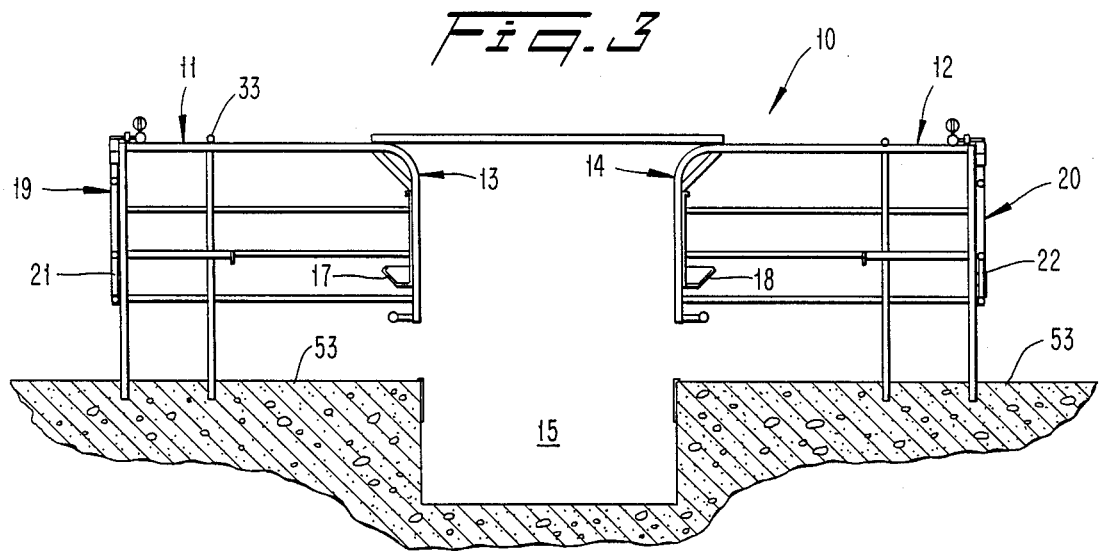
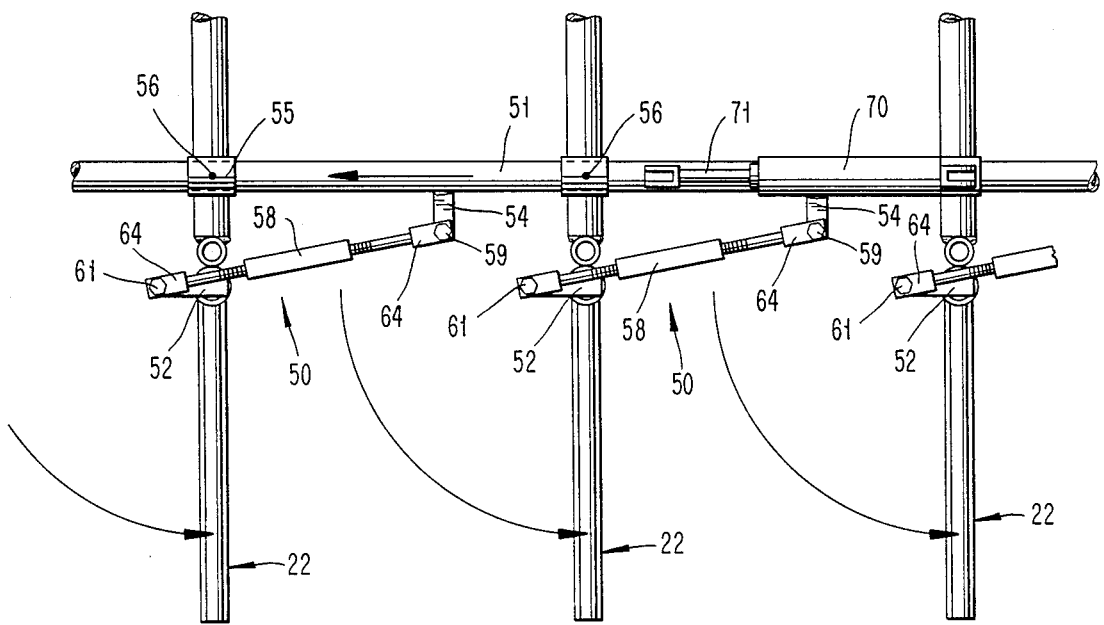

MILKING PLANT AND SORTING SYSTEM

FIELD OF THE INVENTION

This invention relates to a milking plant and sorting system for milking large numbers of cows. More particularly, the invention relates to a milking stall forming part of a milking parlor useful for milking large numbers of cows in a safe, efficient and rapid manner.

BACKGROUND OF THE INVENTION

Various types of milking systems useful in handling and milking large numbers of cows with mechanized milking machines are known. Particularly, stalls are known having entrance gates at one end and exit gates at the other end such as found in U.S. Pat. Nos. 1,928,819; 2,904,002; and 3,805,742. Special designs for milking stalls are known as shown in U.S. Pat. No. 2,593,597 including a milking plant having an animal passage leading to a series of open-ended stall units arranged end-to-end.

U.S. Pat. No. 4,513,687 discloses a feeding apparatus comprising a manger having a plurality of control gates which provide sequential entry into the feeding stalls. These control gates pivot upwardly about a pivot point located on the rotating manger structure to release the animals all at once. A specially designed L-shaped gate is used in front of each of the stalls.

Another system known as the herringbone parlor and is disclosed in U.S. Pat. Nos. 3,157,157; 3,699,922; 3,885,528; 4,419,961; and 4,508,059. The animals enter at one end of the miling parlors, move through the stall locations of the herringbone unit and stop at various feeding locations along the way. The cows are not separated with respect to each other in these herringbone stalls. All of the stalls are open at the same time and therefore the first cow to enter may choose any stall and will not necessarily choose to enter the desired farthest or end stall.

U.S. Pat. No. 3,810,442 discloses a milking system for milking large numbers of cows using a pair of reciprocating shuttling platforms. One platform is batch-loaded and moved to a milking station where the cows are milked while a second parallel platform is being loaded. After the first milking operation, the loaded second platform is moved to the milking station and the first platform returned to the original loading station and unloaded and reloaded. This complex system requires many moving parts making it cumbersome to use and expensive to install and maintain.

PURPOSE OF THE INVENTION

The primary object of the invention is to incorporate several simple structural features in a milking stall to provide a milking parlor capable of handling a larger number of cows while having a smaller space requirement than prior art milking parlors.

Another object of the invention is to provide a milking parlor for confining individual cows within a respective stall to prevent forward or backward animal movement therein and prohibit animal head movement to any position which might otherwise interrupt the milking operation.

A still further object of the invention is to provide a milking parlor having a sequential entry gate system in combination with an exit gate mechanism to either simultaneously or individually release the animals from the exit side of the parlor as desired.

Another object of the invention is to provide an easily installed and efficiently maintained milking plant and sorting system simple construction comprising a parlor having several stalls with outwardly swinging gate members on the exit side thereof to control animal movement while confined within and upon release from each respective stall.

A further object of the invention is to provide a plurality of stalls each including a gate exit member having a novel frame structure to accomplish animal control at the head end and a gutter mechanism elevated above the floor at the animal rear end to satisfactorily confine the animal while milking between its hind legs.

Still another object of the invention is to provide a fast exit system for a milking parlor wherein individual gates are opened and closed simultaneously using a single pneumatically or hydraulically controlled cylinder or individually opened by manually removing a connecting pin from a specially designed linkage mechanism.

SUMMARY OF THE INVENTION

The invention is directed to an individual milking stall comprising parallel wall partitions laterally spaced with respect to each other along a floor by an amount effective to allow a cow to stand widthwise therebetween. The wall partitions are fixedly disposed with respect to the floor and extend rearwardly from post means disposed at an exit side of the stall.

A pivotally mounted exit gate member swings outwardly from the stall exit side and includes frame means defining an aperture through which protrudes the head and neck portion of an animal standing within the stall when the exit gate member is closed. The frame means includes a neck portion contacting means and a lower obstruction section. The neck portion contacting means controls the animal by contact with the animal's neck portion while confined within the stall. The lower obstruction section extends below the aperture frame means by an amount sufficient to prevent the animal from crawling under the gate member.

Gutter means and kicker means laterally spaced rearwardly from the stall exit side by an amount sufficient to allow a cow to stand lengthwise serves to limit animal movement between the gutter means and the neck portion contacting means. The gutter means is effective to catch animal waste at an elevated location above the floor. Kicker means such as a rail member is disposed at a location below the gutter means to protect a milking operator from being kicked by an animal located within a stall of the parlor during the milking operation.

A particular feature of the invention comprises a stall structure having gutter means and its stall exit side substantially parallel with respect to each other. Wall partitions defining each stall are substantially perpendicular to the gutter means and stall exit side. Each gate member includes a pair of horizontally disposed frame members each having free outer ends and being vertically spaced with respect to each other by an amount sufficient to define upper and lower sides of an aperture. The free outer ends define an opening therebetween with a vertically disposed frame member laterally spaced inwardly from the free outer ends to form a U-shaped aperture through which an animal's head and neck portion protrude when the gate member is in a closed position to confine the animal within the stall.

Another feature is directed to a milking system comprising at least one parlor including a floor, a plurality of stalls juxtaposed along the floor, animal entrance means to each stall and animal exit means disposed along an exit side of the parlor. The parlor further includes an animal ingress entry opening at one end thereof, a distal end barrier means at the other end thereof, and gutter means laterally spaced from the exit side and defining one side of an animal passageway from the animal ingress entry opening to the distal end barrier means. A plurality of wall partitions fixedly secured to vertically disposed post means secured to the floor at the parlor exit side defines the stalls.

The fixed wall partitions have free ends and extend inwardly from the vertically disposed post means toward the gutter means by substantially the same amount with respect to each other. Thus, the free ends thereof are laterally spaced inwardly from the gutter means to define the other side of the animal passageway.

The animal exit means includes a gate member pivotally mounted in each stall to swing outwardly from the parlor exit side between a closed position and an open position. Each gate member includes frame means defining an aperture and including a neck portion contacting means and a lower obstruction section as discussed above.

A particular feature of the animal exit means includes opening means having a linkage mechanism for each gate member and a single elongated opening member slidably mounted to move back and forth along its longitudinal axis within a plurality of bushing members laterally spaced with respect to each other along the parlor exit side. One end of each linkage mechanism is connected to a respective gate member and the other end thereof to the elongated opening member. Thus, each gate member may be pivoted between a gate member opened position and a gate member closed position when the elongated opening member moves back and forth.

In another feature of the invention, each linkage mechanism includes a link member fixedly secured at one end thereof to the gate member and pivotally mounted to a pivot pin at the other end thereof. The pivot pin is disposed for manual removal from the linkage mechanism so that a gate member freely swings apart from the linkage mechanism thereby enabling a sorting operation. Pneumatically, hydraulically or manually controlled drive means moves the elongated opening member back and forth along its longitudinal axis.

Another feature of the invention is directed to a milking plant and sorting system comprising a milking parlor including a plurality of juxtaposed stalls each having an entrance gate means and an exit gate means. Opening means simultaneously moves the exit gate means in each juxtaposed stall between a closed position and an opened position to confine an animal when the exit gate means is in the closed position and to free the animal when the exit means is in an opened position. The opening means includes means for allowing each exit gate means to be individually moved between the closed and opened position to enable sorting of animals.

The entrance gate means of each juxtaposed stall is animal activated between a closed condition and an open condition whereby an animal is able to enter a stall when the entrance gate means is in the open condition. The animal will not enter the stall when the entrance gate means is in the closed position.

The milking parlor stalls are defined along a floor by a plurality of fixed wall partitions extending rearwardly from vertically disposed post means secured with respect to the floor along an exit side of the parlor. An animal ingress entry is at one parlor end and barrier means extending from first post means on the parlor exit side close the distal parlor end. Gutter and kicker means define one side of a passageway from the animal ingress entry end to the distal parlor end barrier means.

The fixed wall partitions have free ends located at substantially the same distance from the vertically disposed post means at the parlor exit side. The free ends are laterally spaced inwardly from the gutter and kicker means to define the other side of the animal passageway.

In combination with the animal exits gate means is a sequential entry system. An animal activated entrance gate means for a first stall at the distal parlor end barrier means is in an open condition to allow a first animal to enter the first stall. Upon such entry, the animal and automatically causes the entrance gate means of the next adjacent juxtaposed stall to be moved to an open condition. At the same time, the entrance gate means to the remaining parlor stalls and the exit gate means are closed. Upon entry of an animal into each respective open stall, the entrance gate means for each of the next juxtaposed stalls is opened one at a time in sequence to allow sequential entry of the animals in line within the passageway.

Each exit gate means of the combination includes frame means whereby the neck portion of a confined animal contacts a frame member of a gate member aperture through which the animal's head and neck portion protrude. Such structure precludes animal movement forwardly and backwardly within the stall and prevents movement of the animal's head in any position which might otherwise interrupt its milking. A lower obstruction section prevents an animal from escaping confinement underneath each gate member.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

FIG. 2 is a sectional view of a parlor made of the invention showing the distal end thereof;

FIG. 3 is an elevational view from the animal entry end of the parlor of the invention;

FIG. 4 is a fragmentary top plan view of the parlor of FIG. 2 showing an exit gate in an opened position;

DETAILED DESCRIPTION

Figure 1:
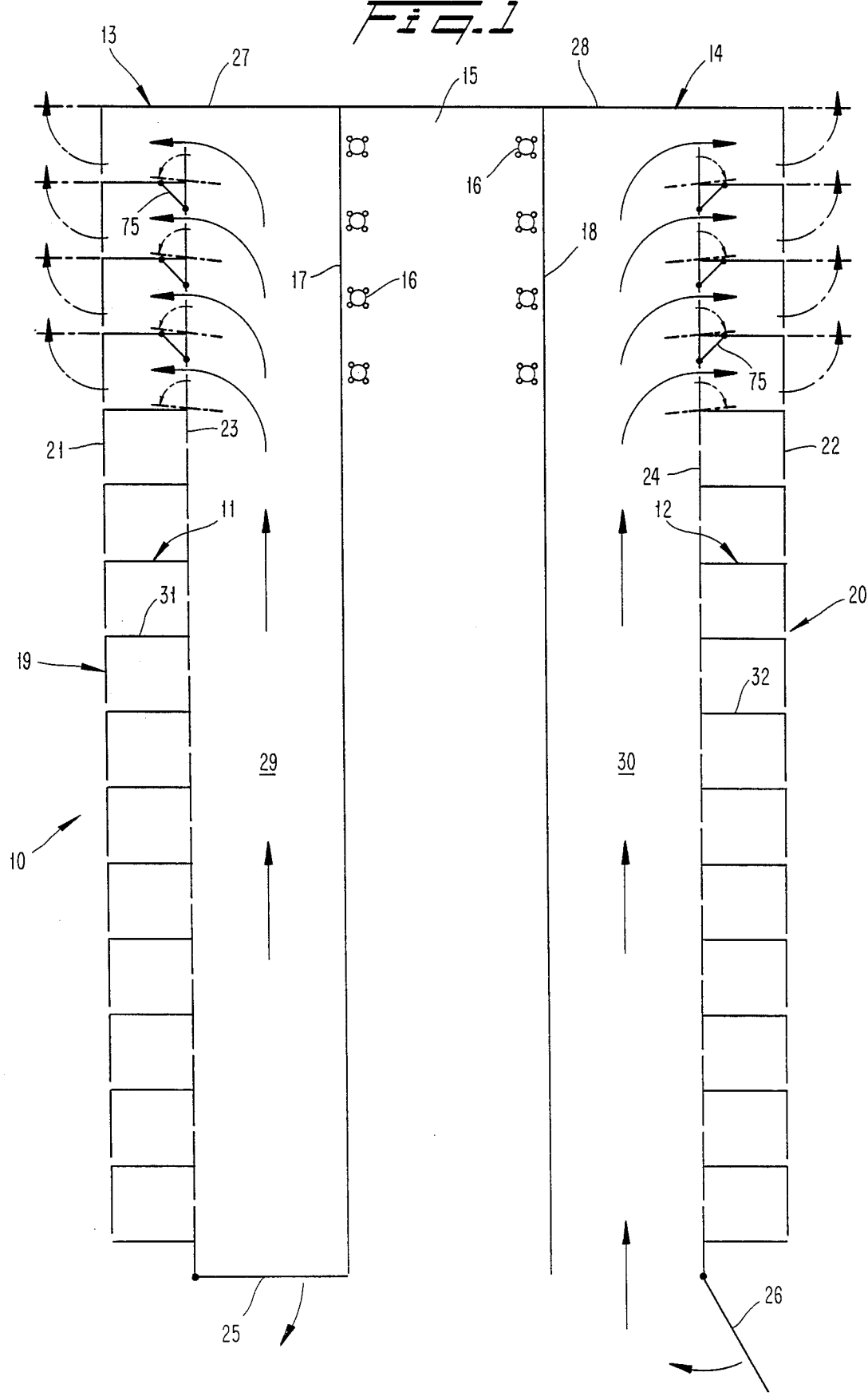
FIG. 1 is a plan schematic view of a milking plant and sorting system made in accordance with this invention.
Figure 5:
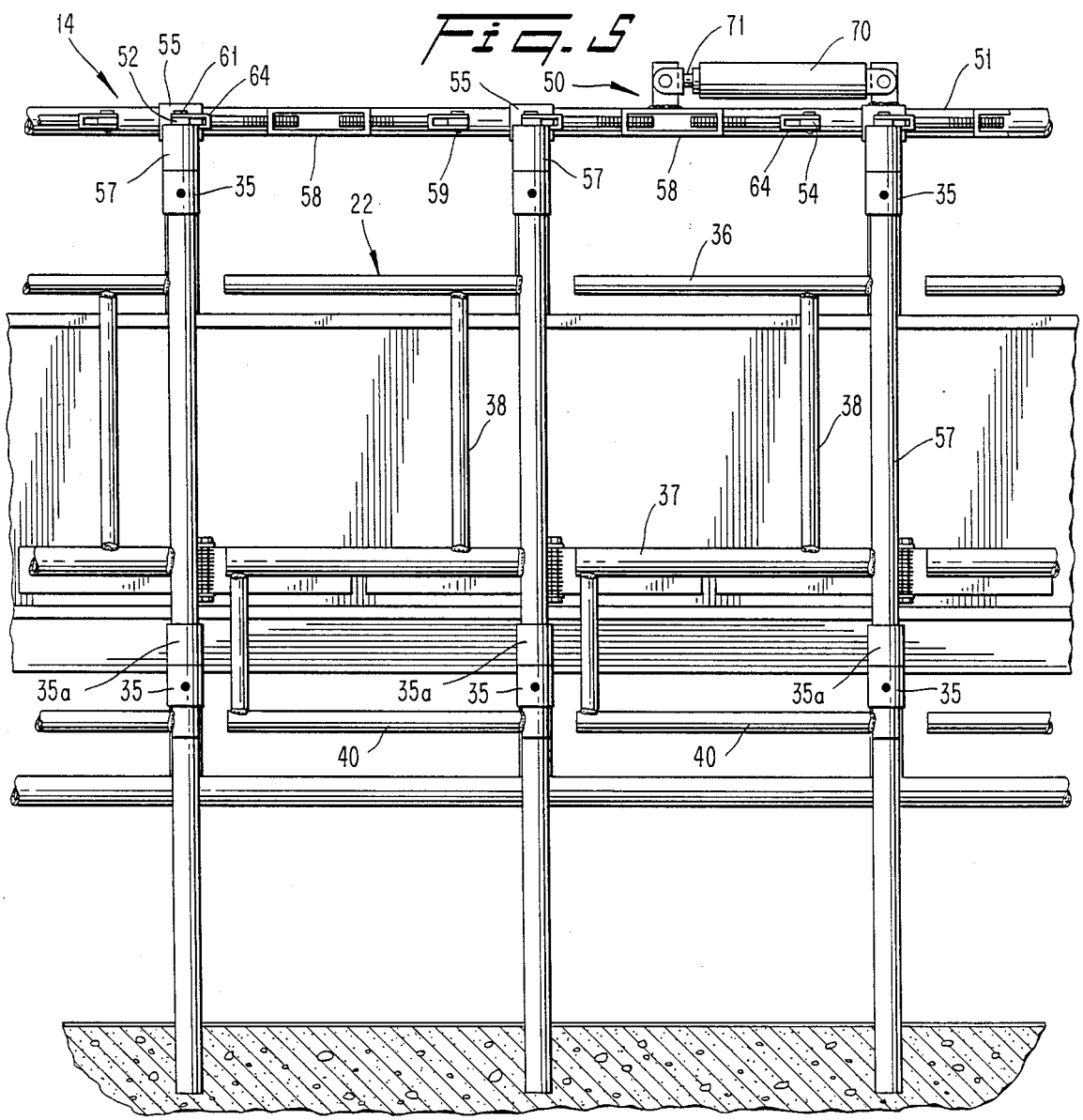
FIG. 5 is a fragmentary elevational view from the exit side of the parlor of FIG. 2.
Figure 6:
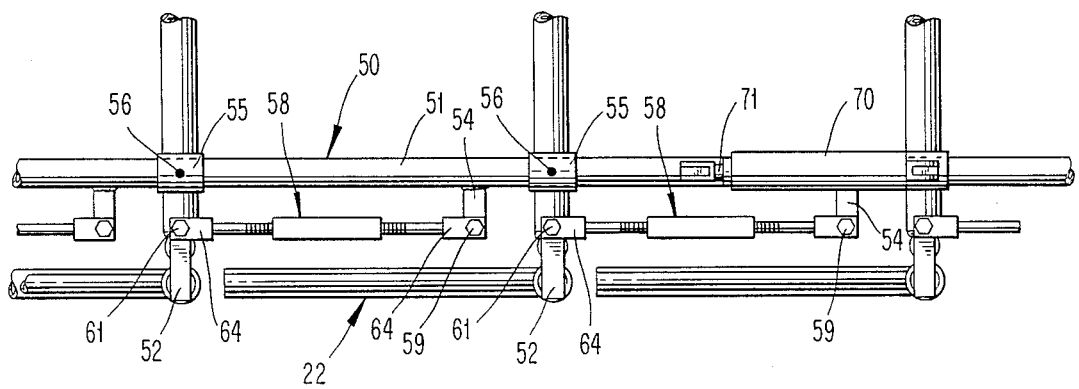
FIG. 6 is a fragmentary top plan view of the parlor of FIG. 2 showing a closed exit gate.
Figure 7:
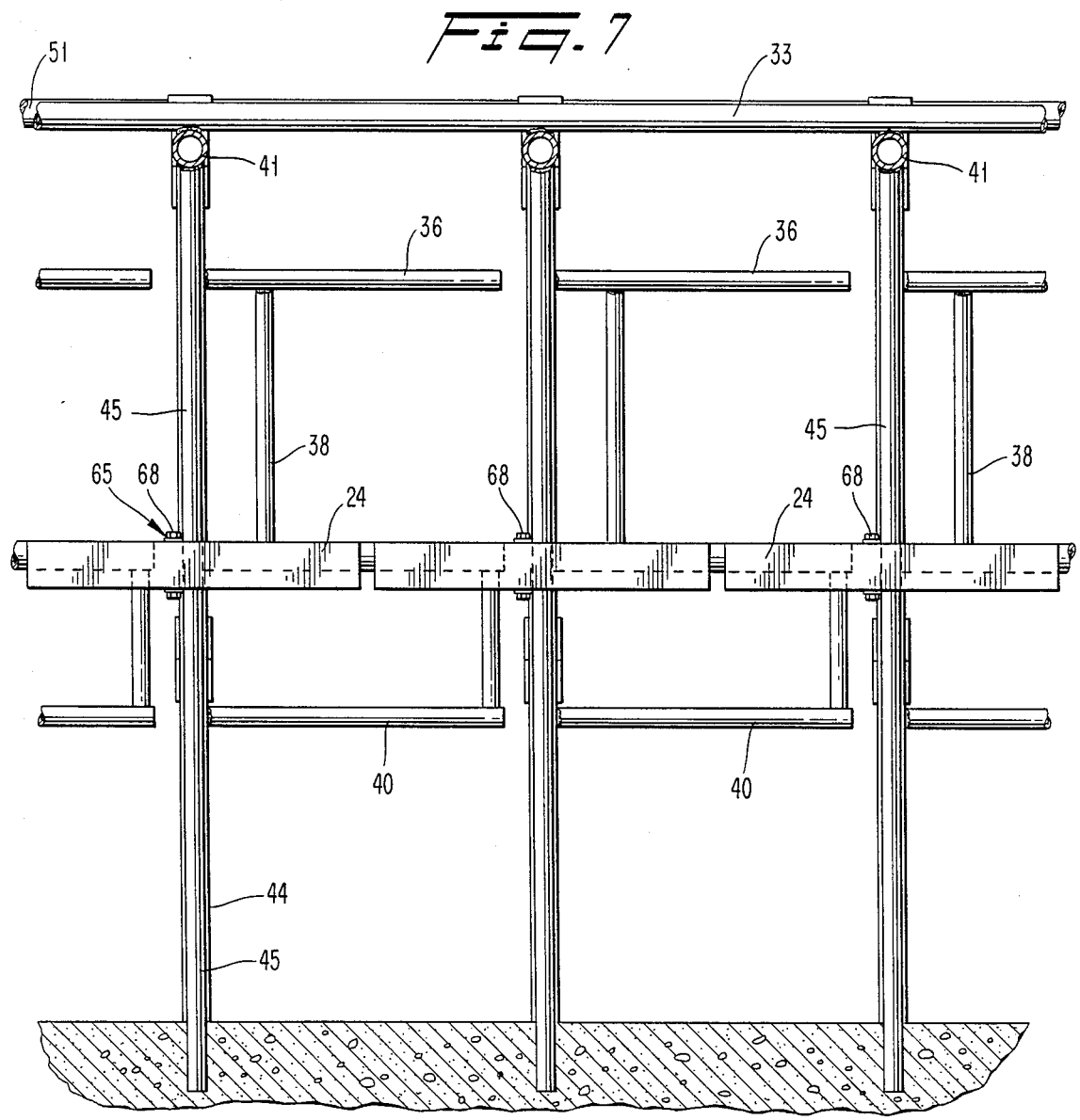
FIG. 7 is a fragmentary sectional view of the parlor along line VII—VII of FIG. 2 showing an entrance gate mechanism of a stall according to the invention.
Figure 8:
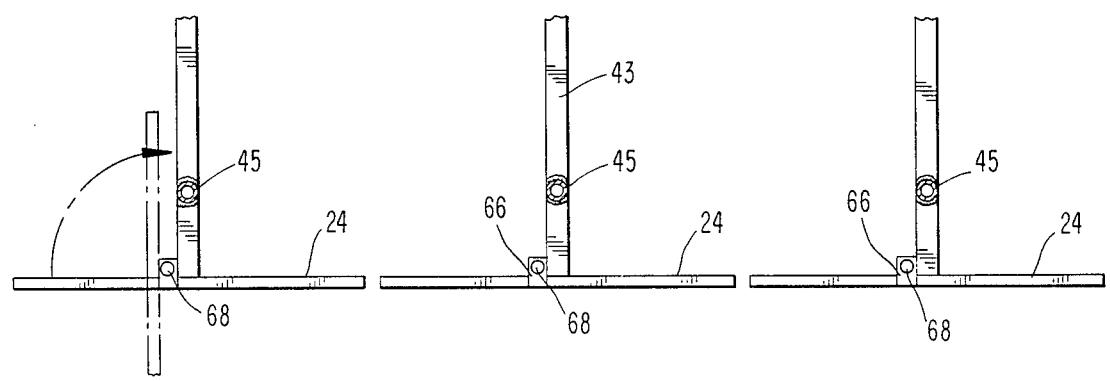
FIG. 8 is a fragmentary sectional view along line VIII—VIII of FIG. 2.

The milking plant and sorting system, generally designated 10, has two milking parlors 13 and 14 disposed along opposing sides of a milking operational area 15.

Each milking parlor 13 and 14 includes a plurality of juxtaposed stalls 11 and 12 each having respective entrance gate members 23 and 24 and exit gate members 21 and 22.

Each parlor 13 and 14 includes respective gutter means 17 and 18 disposed along the opposing sides of milking operational area 15. Respective parlor exit sides 19 and 20 face outwardly from milking operational area 15. Mechanical milking units 16 are located in milking operational area 15 for mechanically milking cows from between their hind legs while confined in stalls 11 and 12 on either side of operational area 15 as shown.

Each parlor 13 and 14 includes respective animal ingress entry openings having gates 25 and 26 and distal barrier end structures 27 and 28. Wall partitions 31 and 32 extend inwardly from vertically disposed post means secured to floor 53 along respective parlor exit sides 19 and 20.

Gutter means 17 and 18 are laterally spaced from exit sides 19 and 20 respectively and define animal passageways 29 and 30 from animal ingress entry ends 25 and 26 to distal parlor end barrier structures 27 and 28. The fixed wall partitions 31 and 32 have free ends located at substantially the same distance from parlor exit sides 19 and 20 and are laterally spaced inwardly from respective gutter means 17 and 18 to define the other side of animal passageways 29 and 30.

Entrance gate members 23 and 24 for a first stall adjacent respective distal barrier ends 27 and 28 are in an open condition to allow a first animal to enter that stall. The entrance gate of the next adjacent juxtaposed stall is then automatically moved to an open condition while the entrance gates to the remaining parlor stalls 11 and 12 and exit gate members 21 and 22 remain closed. In other words, upon entry of an animal in the first stall adjacent respective barrier ends 27 and 28, entrance gate members 23 and 24 for each of the next juxtaposed stalls 11 and 12 are opened one at a time in sequence to allow sequential entry of each of the animals in line within respective animal passageways 29 and 30.

As discussed in detail below, opening means are used for simultaneously moving exit gate members 21 and 22 between a closed position and an opened position whereby animals are confined when exit gate members 21 and 22 are in a closed position and animals are free to exit from confinement when exit gate members 21 and 22 are in an open position. The opening means also allows each gate member 21 and 22 to be individually and separately moved between closed and opened positions to enable sorting of animals.

The milking plant and sorting system for milking a plurality of cows as shown in FIG. 1 provides, for the first time, the total individual control of an animal's movement from the time it enters parlors 13 and 14, during the milking operation and upon exiting after milking. Such controlled animal movement throughout the milking operation is not possible with any known prior art system and provides a safe, efficient, rugged, maintenance free, low cost milking parlor system for the farmer having a large number of cows which can now be milked in a much shorter time period than was possible in earlier milking parlor systems.

The milking plant and sorting system 10 requires a much shorter building than the known herringbone parlors. Stalls 11 and 12 generally have a width of about 29 inches as compared to herringbone parlor stalls which require 42-44 inches of floor space. The way in which exit gate members 21 and 22 open assists in directing the flow of cattle traffic to the return alleys or passageways thereby facilitating the speed at which cows exit from the milking parlor area. The cow's head faces away from milking operational area 15 where the operator is working because of the unique configuration of stalls 11 and 12. Furthermore, the confined cows are unable to see movement in operational area 15 and will consequently remain calm during the milking process.

More specific details of the stall and milking parlor construction are shown in FIGS. 2 through 8. Parlor, generally designated 14, shows a stall 12 having front post members 44 spaced along floor 53 at parlor exit side 20. Post members 45 are located at the free ends of the wall partitions 32. Horizontal wall partition members 43 rigidly connect front post members 44 to free end post members 45 which post members 44 and 45 are fixedly secured in concrete floor 53 in a known manner. As is evident in the drawings and written description herein, concrete floor 53 is stationary therefore post members 44 and 45 are immovably fixed to floor 53.

Overhead frame members 41 extend the length of stall 12 from front post members 44 to rear gutter support member 42. Gutter assembly 18 includes splash panel 46 and gutter trough 47 at an elevated position above floor 53 to catch animal waste before it has a chance to fall on either the milking operator or the milking equipment. Kicker bar 48 extends the entire length of parlor 14 below the gutter 47 to protect a milking operator from being kicked by an animal located within parlor stall 12. Cross-stall connecting members 33 and 34 extend the entire length of parlor 14.

Exit gate member 22 is pivotally mounted to swing outwardly from parlor exit side 20 between a closed position and an opened position. Vertical pivot gate member 57 is pivotally disposed within upper and lower exit gate bushing rings 35 having lubrication fittings. Fixing of the vertical position for pivot gate member 57 with respect to bushings 35 is accomplished in any well known manner. For example, collars 35a fixed to gate member 7 slidably ride on bushing rings 35 as shown.

Upper and lower horizontal bar members 36 and 37 are secured to pivot gate member 57 and are vertically spaced with respect to each other by an amount sufficient to allow an animal's head and neck portion to protrude therebetween. In this specific embodiment, the distance between bar members 36 and 37 is about 26 inches. Lower bar member 37 is about 40 inches above floor 53 so that a confined cow's brisket or lower neck portion is located at the top of bar member 37 when gate member 22 is closed. Thus, bar member 37 constitutes part of a neck portion contacting section which precludes forward or backward animal movement within stall 12 and animal head movement to any position which might otherwise interrupt the milking operation. The cow is effectively snugly fit between bar member 37 and the gutter assembly 18 and kicker rail 48 in combination.

Horizontal gate bar member 40 forms part of a lower obstruction section extending below the aperture formed between bars 36 and 37 by an amount sufficient to prevent animal escape under gate member 22. That is, the cow is blocked from attempting to escape confinement in stall 12 by dropping to its knees and crawling underneath gate member 22.

Horizontal bar members 36 and 37 each have a free outer end to define an opening therebetween. A vertically disposed frame member 38 laterally spaced inwardly from the free outer ends of frame members 36 and 37 forms a U-shaped aperture through which an animal's head and neck protrude when gate member 22 is in a closed position to confine the animal.

Opening means for parlor 14 includes a linkage mechanism 50 for each gate member 22 and a single elongated opening member or push rod 51 slidably mounted to move back and forth along its longitudinal axis within a plurality of bushing or push rod sleeves 55 laterally spaced along parlor exit side 20. Each bushing or push rod sleeve 55 includes a lubrication fitting 56 enabling periodic lubrication for smooth operation of push rod 51 extending along the entire length of parlor 14.

A gate link member 52 is secured to each vertical pivot gate member 57 and a second link member 54 is fixedly attached to elongated push rod 51 at a location intermediate push rod sleeves 55 disposed at either side of an adjacent stall as shown. Turnbuckle 58 is pivotally connected at one end to link member 54 by push rod pivot pin 59 in a nylon bushing (not shown). Gate pivot pin 61 removably disposed in pivot bushing (not shown) connects turnbuckle 58 to gate link member 52. Bifurcated coupling members 64 combined with pivot pins 59 and 61 form the pivotal connection between each gate member 22 and push rod 51. The use of nylon bushings provide continuous maintenance free operation of the opening system.

In a specific embodiment, a hydraulically controlled piston member 71 is pivotally connected to push rod 51 at one end of parlor 14. With piston hydraulic cylinder 70 controlling back and forth movement of push rod 51, all of gate members 22 along parlor exit side 20 are swung between opened and closed positions as is evident in the drawings.

Entrance members 24 are pivotally mounted at one side of post members 45 and, thus, pivot one way only. That is, the location of the hinge point for the pivotally mounted entrance member 24 controls the direction of its rotation. An elastomeric strap 72 composed of rubber may be fixed at one end thereof to gate member 24 and to partition member 43 at the other end thereof.

When entrance member 24 pivots inwardly within the stall occupied by the cow, a biasing force applied by such rubber strap 72 swings entrance member 24 back to a closed position where it extends in a direction parallel to animal passageway 30. This happens when the animal is released upon opening of exit gate member 22. See FIG. 1 where strap 72 is schematically shown on three stalls 11 and 12 on either side of area 15.

A further hinge mechanism 65 for entrance gate 24 includes a hinge bracket 66 mounted at one side of free end post member 45. Hinge pin 68 holds entrance member 24 in place with coil hinge spring 67 held in place by spring anchor member 69. Spring 67 produces a biasing force on entrance gate member 24 when pivoted inwardly by an animal confined within stall 12.

In this particular embodiment, two-inch (2") diameter galvanized pipe is used for support posts 44 and 45 and the push rod 51. A two and a half-inch (2½") diameter pipe section six-inches long forms bearing sleeves or bushings 55 and 35. Entrance gate bar member 24 is formed of a three-inch by one-inch rectangular tube section.

As shown, the entrance gate means of this embodiment comprises a sequential entry gate system. Each entrance gate member 24 extends half-way into one stall to provide a push bar for the cow to open the next stall. Entrance gate member 24 also extends half-way into the next adjacent stall to effectively block that stall off until the first stall is occupied by an animal. As the cow enters the first stall, her stomach pushes against push bar member 24 and opens up the next adjacent stall to allow entry of the next cow in line within animal passageway 30. Because of the disposition of hinge 65, gate member 24 pivots only in one direction so that the cow cannot stop part-way through parlor 14 and enter the wrong stall. The animal must continue through parlor 14 until she comes to the next available stall. When the cow exits the parlor, entry gate member 24 is returned to its loading position by biasing means such as coil hinge spring 67 or rubber strap 72.

Each exit gate member 22 may be individually opened by manually removing connecting pin 61 at the end of turnbuckle 58. Thus, one cow can be released by itself and directed to a treatment area or a loading bay thereby effecting a sorting operation from among a group of cows in a very simple manner.

The gate opening system is extremely rugged and inexpensive to build. In a specific embodiment, exit gate member 22 is composed of two-inch (2') galvanized pipe pivoting inside bearing sleeves 35 composed of two and a half-inch (2½') diameter galvanized pipe fitted with lubrication fittings.

The hydraulic or pneumatic cylinder 70 used to operate the gate system may be adjusted to use a minimum amount of force to open and close gate members 22. This eliminates any danger of a gate falling on the cow and injuring it.

The particular design of the milking stall of this invention is such that it provides much less room for the animal in which to move around. This thereby eliminates problems the animal may cause with regard to the milking operation as well as minimizing the likelihood of injury to the cow itself.

When the cow enters stall 12, its head and neck protrudes through the aperture of gate member 22 and its brisket comes against the lower cross member 37 as discussed above. When in this position, the cow cannot move forward or backward at all. Its entire body is contained within stall 12. All movement of the cow's head upwardly in the air or downwardly between her feet or allowing her to turn from side-to-side is eliminated by the structure of stall 12 made in accordance with the invention.

Neck rail or bar member 37 is located in the range of from about 38 inches to about 42 inches above floor 53. The distance between neck rail 37 and upper cross bar 36 is in the range of from about 24 inches to about 28 inches. The lower edge of obstruction section 40 measures in the range of from about 26 inches to about 30 inches above floor 53. The free outer ends of bars 36 and 37 extend outwardly from pivot member 57 to a point located at the other side of stall 12 or about 6 inches short of the other side. Vertical member 38 is in the range of from about 4 inches to about 6 inches between the center longitudinal axes of pivot member 57 and vertical member 38. The length of stall 12 measured between the center axes of front post 44 and rear gutter support pipe 42 is in the range of from about 6 feet 3 inches to about 6 feet 7 inches with the specific embodiment being 6 feet 4½ inches.

While the milking plant and sorting system has been shown and described in detail, it is obvious that this invention is not to be considered as limited to the exact form disclosed, and that changes in detail and construction may be made therein within the scope of the invention without departing from the spirit thereof.

Having thus set forth and disclosed the nature of this invention, what is claimed is:

1. A milking plant and sorting system for milking a plurality of cows, said system comprising:

(a) a milking parlor including a plurality of juxtaposed stalls each having an entrance gate means and an exit gate means;

(b) opening means for simultaneously moving said exit gate means of each juxtaposed stall between a closed position and an opened position whereby an animal is confined when the exit gate means is in the closed position and the animal is free to exit from its confinement when the exit gate means is in an opened position;

(c) said opening means including means for allowing each said exit gate means to be individually moved between said closed position and said opened position to enable the sorting of animals;

(d) said entrance gate means of each juxtaposed stall being animal activated between a closed condition and an open condition whereby an animal is able to enter a stall when the entrance gate means is in said open condition and said animal will not enter the stall when the entrance gate means thereof is in the closed condition;

(e) said parlor including a floor with said stalls being defined along the floor by a plurality of fixed wall partitions extending inwardly from vertically disposed post means secured to the floor along a parlor exit side;

(f) said parlor having an animal ingress entry at one end thereof and being closed at the distal end thereof by barrier means extending from first post means on the parlor exit side to gutter means laterally spaced from the exit side to define one side of an animal passageway from said animal ingress entry end to said parlor distal end barrier means;

(g) said fixed wall partitions having free ends located at substantially the same distance from said parlor exit side and laterally spaced inwardly from the gutter means to define the other side of said animal passageway;

(h) said entrance gate means for a first stall at the distal end barrier means being in an open condition to allow a first animal to enter said first stall and automatically cause the entrance gate means of the next adjacent juxtaposed stall to be moved to an open condition while said entrance gate means to the remaining parlor stalls and the exit gate means are closed;

(i) upon entry of an animal into said first stall, said entrance gate means for each of the next juxtaposed stalls is opened one at a time in sequence to allow sequential entry of each of the next animals in line within said passageway;

(j) said gutter means being effective to catch animal waste at an elevated location above the parlor floor; and (k) kicker means disposed below the gutter means to protect a milking operator from being kicked by an animal located within a parlor stall;

(l) each said exit gate means including frame means having a neck portion contacting section and a lower obstruction section and defining an aperture through which protrudes the head and neck portion of a confined animal standing within a parlor stall;

(m) said neck portion contacting section precludes forward or backward animal movement within the stall and animal head movement to any position which might otherwise interrupt the milking of the animal;

(n) said lower obstruction section extends below the aperture by an amount sufficient to prevent animal escape under the exit gate means.

2. A system as defined claim 1 wherein said exit gate means includes a gate member pivotally mounted to swing outwardly from said parlor exit side and from one side of each respective parlor stall.

3. A system as defined in claim 2 wherein each said gate member includes a pair of horizontally disposed upper and lower frame members each having free outer ends and being vertically spaced with respect to each other by an amount sufficient to define upper and lower sides of said aperture through which said animal's head and neck portion protrude, said lower frame member forming said lower side constitutes said neck portion contacting section.

4. A system defined in claim 3 wherein said free outer ends of the horizontally disposed frame members define an opening therebetween, and a vertically disposed frame member laterally spaced inwardly from the free outer ends of the horizontal frame members forms a U-shaped aperture through which an animal's head and neck portion protrude when the gate member is in a closed position to confine the animal.

5. A system as defined in claim 1 wherein said neck portion contacting section includes a frame member extending across the exit gate means to define a lower side of the aperture.

6. A system as defined in claim 1 wherein there are two parlors disposed along opposing sides of a milking operational area, each gutter means of said two parlors being disposed along said opposing sides of the milking operational area with each of the respective parlor exit sides facing outwardly from the milking operational area, said milking operational area including milking means for mechanically milking from between the hind legs of cows confined within each respective parlor stall.

7. A milking system comprising (a) at least one parlor including a stationary floor, a plurality of stalls fixedly juxtaposed along the floor, animal entrance means to each stall and animal exit means disposed along an exit side of at least one parlor;

(b) said at least one parlor including an animal ingress entry opening at one end thereof, a distal end barrier means at the other end thereof, and gutter means laterally spaced from the exit side to define one side of an animal passageway from the animal ingress entry end the distal end barrier means;

(c) said stalls being defined by fixed wall partitions rigidly secured to vertically disposed post means immovably fixed to the floor at the parlor exit side;

(d) said fixed wall partitions extending toward the gutter means inwardly from the parlor exit side by substantially the same amount with respect to each other and having entrance ends laterally spaced from the gutter means to define another opposing side of said animal passageway;
(e) said animal exit means including a gate member pivotally mounted to the fixedly disposed post means at each stall to swing outwardly from said parlor exit side between a closed position and an opened position;
(f) each gate member including frame means defining an aperture through which protrudes the head and neck portion of an animal confined within a parlor stall;
(g) said frame means including a neck portion contacting section which precludes forward or backward animal movement within the stall and animal head movement to any position which might otherwise interrupt the milking of the animal;
(h) said animal exit means includes opening means having a linkage mechanism mounted to each gate member and a single elongated opening member slidably mounted to move back and forth along its longitudinal axis within a plurality of bushing members at an elevated position above the floor and laterally spaced along the parlor exit side,
(i) each linkage mechanism connected at one end thereof to a respective gate member and at the other end thereof to the elongated opening member to cause the gate member to pivot between said opened and closed positions when the elongated opening member moves back and forth.

8. A parlor as defined in claim 7 wherein said frame means includes a pair of horizontally disposed frame members vertically spaced with respect to each other by an amount sufficient to allow an animal's head and neck portion to protrude therebetween.

9. A parlor as defined in claim 8 wherein said neck portion contacting section includes a vertically disposed frame member laterally spaced inwardly from free outer ends of the horizontally disposed frame members by an amount sufficient to form said aperture.

10. A parlor as defined in claim 7 wherein each linkage mechanism includes a link member fixedly secured at a one end thereof to the gate member and pivotally mounted to a pivot pin at the other end thereof,
said pivot pin being removably disposed from the linkage mechanism to allow a respective gate member to freely swing apart from the linkage mechanism.

11. A system as defined in claim 7 wherein each said linkage mechanism includes a pivot pin defining a pivot connection between the elongated opening member and each respective gate member,
said pivot pin being removably disposed from each respective linkage mechanism to allow a respective gate member to freely swing apart from the linkage mechanism.

12. A system as defined in claim 11 wherein said opening means includes drive means for moving the elongated opening member back and forth along its longitudinal axis.

13. A system as defined in claim 12 wherein said drive means includes hydraulically controlled piston means connected to the elongated opening member.

14. A milking system comprising
(a) at least one parlor including a stationary floor, a plurality of stalls fixedly juxtaposed along the floor, animal entrance means to each stall and animal exit means disposed along an exit side of at least one parlor;
(b) said at least one parlor including an animal ingress entry opening at one end thereof, a distal end barrier means at the other end thereof, and gutter means laterally spaced from the exit side to define one side of an animal passageway from the animal ingress entry end to the distal end barrier means;
(c) said stalls being defined by fixed wall partitions rigidly secured to vertically disposed post means immovably fixed to the floor at the parlor exit side;
(d) said fixed wall partitions extending toward the gutter means inwardly from the parlor exit side by substantially the same amount with respect to each other and having entrance ends laterally spaced from the gutter means to define another opposing side of said animal passageway;
(e) said animal exit means including a gate member pivotally mounted to the fixedly disposed post means at each stall to swing outwardly from said parlor exit side between a closed position and an opened position;
(f) each gate member including frame means defining an aperture through which protrudes the head and neck portion of an animal confined within a parlor stall;
(g) said frame means including a neck portion contacting section which precludes forward or backward animal movement within the stall and animal head movement to any position which might otherwise interrupt the milking of the animal.
(h) fixed overhead frame means extending in a direction parallel to the fixed wall partitions from the vertically disposed post means at the parlor exit side rearwardly to the gutter means which extend downwardly from the overhead frame means, and
(i) the gutter means is effective to catch animal waste at an elevated location above the parlor floor.

15. A milking stall system comprising:
(a) a plurality of stalls disposed side-by-side along a stationary floor with each stall including (i) fixed parallel wall partitions laterally spaced with respect to each other along the floor by an amount effective to form each stall of the system and allow a cow to stand widthwise therebetween, and (ii) fixed overhead frame means extending in a direction parallel to the fixed wall partitions;
(b) said wall partitions and overhead frame means fixedly disposed with respect to the floor and extending rearwardly from and substantially perpendicular to an exit side of the stall system;
(c) exit means including an exit gate member pivotally mounted to swing outwardly from the exit side of the stall system along the same side of each said side-by-side stall;
(d) gutter means extending downwardly from the overhead frame means and laterally spaced rearwardly from and substantially parallel to the stall system exit side by an amount sufficient to (i) allow a cow to stand lengthwise between said exit gate member and the gutter means effective to catch animal waste at an elevated location above the floor at the cow's rear end and (ii) define one side of an animal passageway extending along the length of the stall system;

(e) each said exit gate member including a pair of horizontally disposed frame members each having free outer ends and being vertically spaced with respect to each other by an amount sufficient to define upper and lower sides of an aperture through which protrudes the head and neck portion of a confined animal standing within the stall when the exit gate member is in a closed position;

(f) a lower member of said pair of frame members including a neck portion contacting section which precludes forward and backward animal movement within the stall and animal head movement to any position which might otherwise interrupt the milking of the animal;

(g) said exit means including a linkage mechanism for each gate member and a single elongated opening member slidably mounted to move back and forth along its longitudinal axis within a plurality of bushing members at an elevated position above the floor and laterally spaced along the stall system exit side;

(h) each linkage mechanism connected at one end thereof to a respective exit gate member and at the other end thereof to the elongated opening member to cause each gate member to pivot between said opened and closed positions when the elongated opening member moves back and forth.

16. A system as defined in claim 15 wherein
said free outer ends of the horizontally disposed frame members define an opening therebetween, and
a vertically disposed frame member laterally spaced inwardly from the free outer ends of the horizontal frame members forms a U-shaped aperture through which an animal's head and neck portion protrude when the gate member is in a closed position to confine the animal.

17. A system as defined in claim 15 wherein
the gate member frame means includes a lower obstruction section extending below said aperture by an amount sufficient to prevent animal escape under the gate member.

* * * * *